(12) United States Patent
Wurtenberger et al.

(10) Patent No.: US 8,537,784 B1
(45) Date of Patent: Sep. 17, 2013

(54) INCREASING THE RESCAN TIMER IN A WIRELESS COMMUNICATION DEVICE

(75) Inventors: Andrew Mark Wurtenberger, Olathe, KS (US); Sachin R. Vargantwar, Overland Park, KS (US)

(73) Assignee: Sprint Communication Company L.P., Overland Park, KS (US)

( * ) Notice: Subject to any disclaimer, the term of this patent is extended or adjusted under 35 U.S.C. 154(b) by 463 days.

(21) Appl. No.: 12/763,304

(22) Filed: Apr. 20, 2010

(51) Int. Cl.
*H04W 4/00* (2009.01)

(52) U.S. Cl.
USPC .................................. 370/332; 455/435.2

(58) Field of Classification Search
None
See application file for complete search history.

(56) References Cited

U.S. PATENT DOCUMENTS

| | | | |
|---|---|---|---|
| 5,119,502 A | 6/1992 | Kallin et al. | |
| 5,666,355 A | 9/1997 | Huah et al. | |
| 5,842,122 A | 11/1998 | Schellinger et al. | |
| 5,995,829 A | 11/1999 | Broderick | |
| 6,282,419 B1 * | 8/2001 | Findikli | 455/434 |
| 6,400,948 B1 | 6/2002 | Hardin | |
| 6,775,531 B1 | 8/2004 | Kaewell et al. | |
| 7,174,188 B2 | 2/2007 | Kiyomoto et al. | |
| 7,197,312 B2 | 3/2007 | Gunaratnam et al. | |
| 7,263,358 B2 | 8/2007 | Chiou | |
| 7,330,727 B2 | 2/2008 | Korneluk et al. | |
| 7,480,519 B2 | 1/2009 | Jeong et al. | |
| 7,593,727 B2 | 9/2009 | Zhao et al. | |
| 2004/0106423 A1 * | 6/2004 | McGowan et al. | 455/522 |
| 2004/0192254 A1 * | 9/2004 | Choi et al. | 455/411 |
| 2004/0224696 A1 | 11/2004 | Korneluk et al. | |
| 2006/0003768 A1 | 1/2006 | Chiou | |
| 2006/0258386 A1 | 11/2006 | Jeong et al. | |
| 2007/0047476 A1 | 3/2007 | Zhao et al. | |
| 2007/0218926 A1 | 9/2007 | Zhuang et al. | |
| 2007/0293244 A1 | 12/2007 | Lee et al. | |
| 2009/0274118 A1 | 11/2009 | De Sanctis et al. | |
| 2010/0067492 A1 | 3/2010 | Kamei | |
| 2011/0205946 A1 * | 8/2011 | Avital et al. | 370/311 |

OTHER PUBLICATIONS

U.S. Appl. No. 13/074,577, filed Mar. 29, 2011.
U.S. Appl. No. 13/032,800, filed Feb. 23, 2011.

* cited by examiner

*Primary Examiner* — Yong Zhou (57) ABSTRACT

Embodiments disclosed herein provide systems and methods for increasing the rescan timer for a wireless communication device. In a particular embodiment, a method comprises determining locations of the wireless communication device and detecting performance conditions when the wireless communication device transitions between communicating with a home wireless network and a visited wireless network. The method further comprises correlating the performance conditions to the corresponding locations of the wireless communication device and processing the correlated performance conditions and corresponding locations to determine a geographic area having performance issues when transitioning between communicating with the home wireless network and the visited wireless network. If the wireless communication device communicates with the visited wireless network when in the geographic area, then the method provides increasing the home wireless network rescan timer.

20 Claims, 10 Drawing Sheets

INCREASING THE RESCAN TIMER IN A WIRELESS COMMUNICATION DEVICE

TECHNICAL BACKGROUND

Wireless communication devices, such as cellular phones, communicate with other devices and systems using wireless communication networks. A user of a wireless device may be a customer of a company that operates a wireless network that the wireless device uses to communicate. However, in some situations, the wireless device is unable to communicate using the company's wireless network. In those situations, the wireless device may be able to communicate using other wireless networks. The wireless device communicating using another wireless network is commonly referred to as roaming.

For various reasons, such as cost and communication efficiencies, it is preferential for a wireless device not to roam. Therefore, a wireless device has a rescan timer for when the wireless device is roaming. The rescan timer provides the wireless device with a period of time, after which the wireless device must search for whether a non-roaming wireless network is available for communications. However, the issues causing the wireless device to roam may still exist on the non-roaming wireless network, thus, causing the wireless device to transfer back and forth between roaming and non-roaming whenever the rescan timer expires. This back and forth transference is commonly called ping ponging and can cause dropped calls and dropped data packets among other communication issues.

OVERVIEW

Embodiments disclosed herein provide systems and methods for increasing the rescan timer for a wireless communication device. In a particular embodiment, a method comprises determining locations of the wireless communication device and detecting performance conditions when the wireless communication device transitions between communicating with a home wireless network and a visited wireless network. The method further comprises correlating the performance conditions to the corresponding locations of the wireless communication device and processing the correlated performance conditions and corresponding locations to determine a geographic area having performance issues when transitioning between communicating with the home wireless network and the visited wireless network. If the wireless communication device communicates with the visited wireless network when in the geographic area, then the method provides increasing the home wireless network rescan timer.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
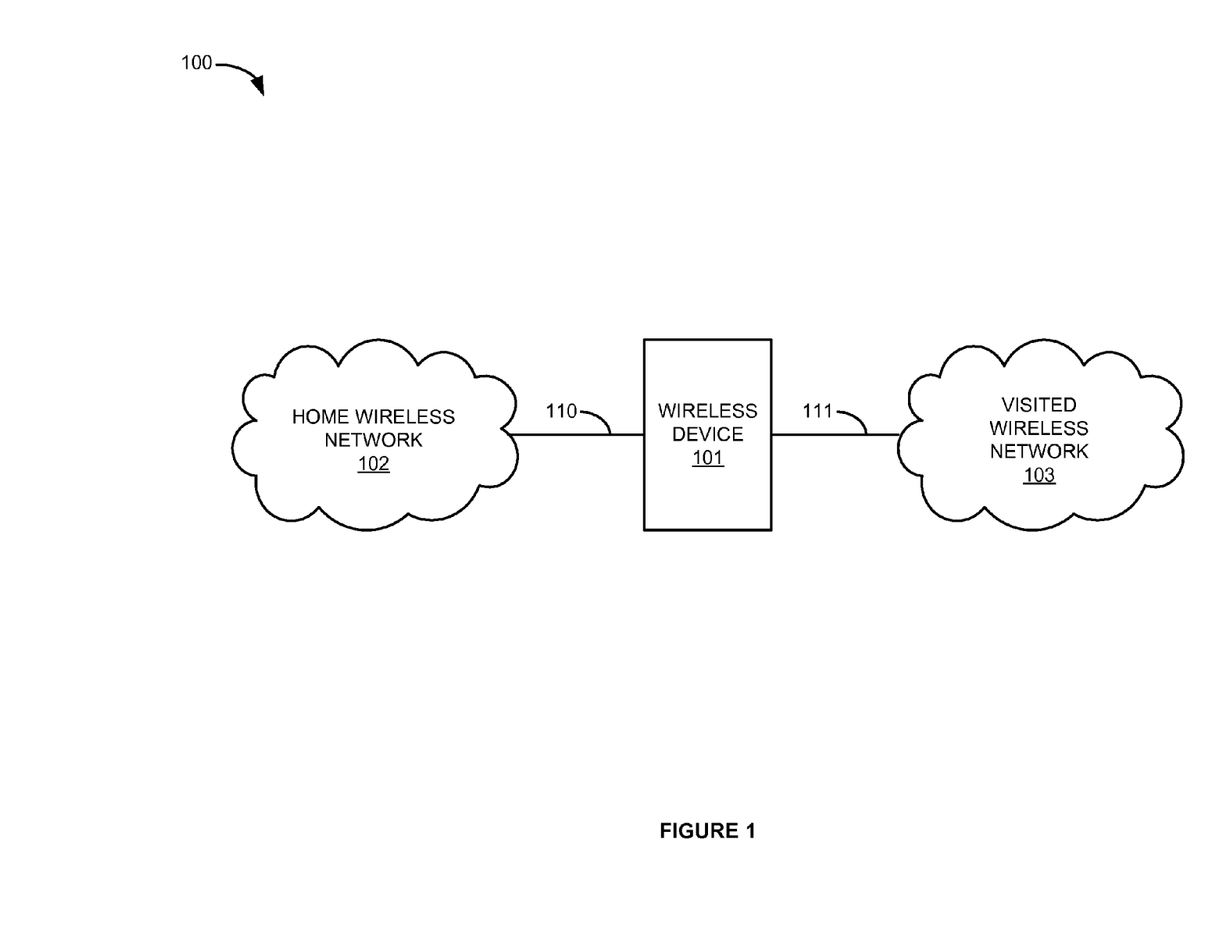
FIG. 1 illustrates a wireless communication system.

FIG. 1 illustrates wireless communication system 100. Wireless communication system 100 includes wireless communication device 101, home wireless network 102, and visited wireless network 103. Wireless communication device 101 and home wireless network 102 communicate over wireless link 110. Wireless communication device 101 and visited wireless network 103 communicate over wireless link 111.

In operation, wireless device 101 is capable of wirelessly communicating with both home wireless network (HWN) 102 and visited wireless network (VWN) 103. HLN 102 may be a network that is associated with wireless device 101. For example, the user of wireless device 101 may be a customer of the company that operates HWN 102 while VWN 103 may be operated by a different entity. In some geographic locations wireless device 101 may not be able to communicate with access nodes of HWN 102. However, in those locations, wireless device 101 may instead be able to communicate with access nodes of VWN 103.

Similarly, there may exist geographic locations where wireless device 101 is capable of communicating with access nodes from both HWN 102 and VWN 103. In those locations, wireless device 101 may transition between communicating with HWN 102 and VWN 103. When wireless device 101 is communicating with VWN 103 then wireless device 103 is typically considered to be roaming off of HWN 102. The transitions may be caused, for example, by varying signal strengths between wireless device 101 and the two wireless networks. Excessive transitions between HWN 102 and VWN 103 is commonly referred to as ping ponging. Ping ponging may cause wireless device 101 to drop calls and miss data packets among other negative effects.

When communicating with VWN 103, wireless device 101 maintains a home network rescan timer. The rescan timer keeps track of when wireless device 101 should search (or scan) for access nodes on HWN 102 so that wireless device 101 can transfer from communicating with VWN 103. If HWN 102 is not viable for communications with wireless device 101, then the rescan timer resets and wireless device 101 searches for access nodes on HWN 102 again after another time period elapses. Otherwise, if wireless finds an access node on HWN 102 that is viable for wireless communications, then wireless device 101 transfers to communicating with HWN 102 from VWN 103.

In some situations, however, wireless device 101 will determine that HWN 102 is viable for communications at the time of search, but then experiences wireless communication performance issues after transferring to HWN 102. Performance issues may be data packet loss, dropped calls, or transferring back to VWN 103. During these situations, despite the determination by wireless device 101 that HWN 102 is viable for communications upon exhaustion of the rescan timer, VWN 103 may be more appropriate for communications in the current geographic area of wireless device 101.

Figure 2:
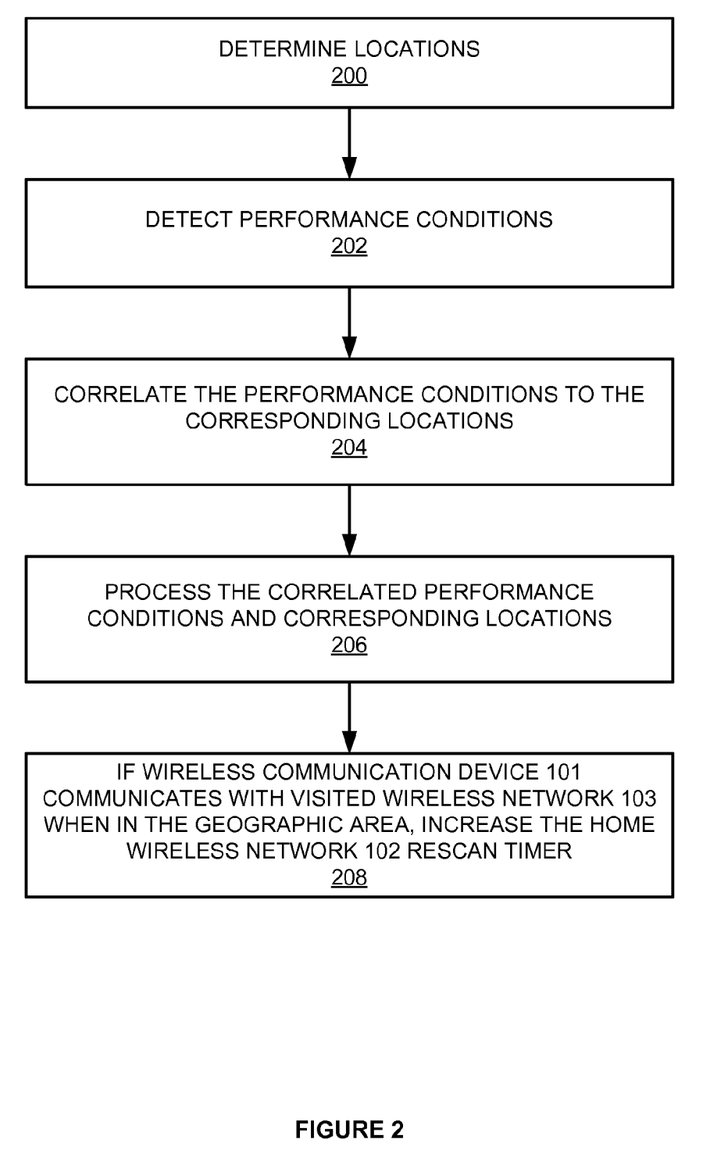
FIG. 2 illustrates the operation of a wireless communication system.

FIG. 2 illustrates the operation of wireless communication system 100. Step 200 provides determining locations of wireless device 101. Wireless device 101 may determine locations of wireless device 101 by obtaining current Global Positioning System (GPS) coordinates of wireless device 101, recognizing a base station identifier for a base station of either HWN 102 or VWN 103, querying HWN 102 or VWN 103, or any other method for ascertaining locations of wireless device 101.

In step 202, wireless device 101 detects performance conditions. The performance conditions relate to network performance conditions that occur when wireless device 101 transitions between communicating with HWN 102 and VWN 103. The performance conditions may include losing wireless connectivity with HWN 102 and reestablishing wireless connectivity with VWN 103, when connectivity of wireless device 101 with the HWN 102 has a signal to noise ratio that falls below a threshold signal to noise value, when wireless communications between wireless device 101 and HWN 102 have a frame error rate greater than a threshold frame error value, or any other any other issue relating to poor wireless connectivity performance. The performance conditions may be caused by distance from wireless communication device 101 to access nodes for either HWN 102 and VWN 103, geographic elements, buildings and other man made objects, atmospheric conditions, or anything else that may affect wireless connectivity.

Step 204 correlates the performance conditions to the corresponding locations of wireless device 101. The correlation allows wireless device 101 to determine a pattern of performance conditions that occur in the corresponding locations of wireless device 101. Step 206 then processes the correlated performance conditions and corresponding locations to determine a geographic area having performance issues when transitioning between HWN 102 and VWN 103. The geographic area may be an area encompassing locations where performance conditions occurred based on the correlation between performance conditions and corresponding locations. For example, if the correlation shows a pattern of performance conditions occurring at locations that all fall within a specific geographic area, then wireless device 101 may determine that the specific geographic area is the geographic area for the purposes of step 206.

In some examples, the performance conditions may occur in and the geographic area may be a boundary zone between the wireless coverage areas of HWN 102 and VWN 103. In other examples, the performance conditions may occur in and the geographic area may be an area that has similar wireless coverage provided by both HWN 102 and VWN 103. Likewise, the geographic area may span the wireless coverage areas of multiple access nodes on HWN 102 and/or VWN 103.

If wireless communication device 101 communicates with VWN 103 when in the geographic area, then step 208 increases the HWN 102 rescan timer. Increasing the rescan timer lengthens the time before wireless communications device 102 checks whether HWN 102 is viable for exchanging wireless communications. Therefore, an increased rescan time allows wireless communication device 101 to either move out of the determined geographic area or for whatever issue that was causing the performance conditions to be remedied.

In some embodiments, step 208 may also provide that wireless communication device 101 is to prefer the VWN 103. When wireless communication device 101 prefers VWN 103, wireless communications device 101 will only transfer to HWN 102 for communications if VWN 103 is not viable for wireless communications. Thus, even if the rescan timer for HWN 102 expires and wireless communication device 101 determines that HWN 102 is viable for wireless communications, wireless communication device 101 will still communicate with VWN 103 as long as VWN 103 is still viable for wireless communications and wireless communication device 101 is still located in the geographic area.

In some embodiments, wireless communication device 101 may further increase the rescan timer if wireless communication device 101 transfers back to communicating with HWN 102 from VWN 103 and detects another performance condition within a period of time thereafter. Thus, the rescan timer can continually be increased if performance conditions continue to be detected in the determined geographic area Likewise, the geographic area can be modified upon detection of further performance conditions. Additionally, when wireless communication device 101 moves out of the determined geographic area, the wireless communication device 101 may return the rescan timer to a default value.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Home wireless network 102 and visited wireless network 103 are communication networks that comprises telephony switches, wireless access nodes, Internet routers, network gateways, computer systems, communication links, or some other type of communication equipment—including combinations thereof. Wireless access nodes comprise RF communication circuitry and an antenna. The RF communication circuitry typically includes an amplifier, filter, RF modulator, and signal processing circuitry. Wireless access nodes within HWN 102 and VWN 103 may also comprise a router, server, memory device, software, processing circuitry, cabling, power supply, network communication interface, structural support, or some other communication apparatus. The wireless access nodes may comprise a base station, Internet access node, telephony service node, wireless data access point, or some other wireless communication system—including combinations thereof.

Wireless link 110-111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Figure 3:
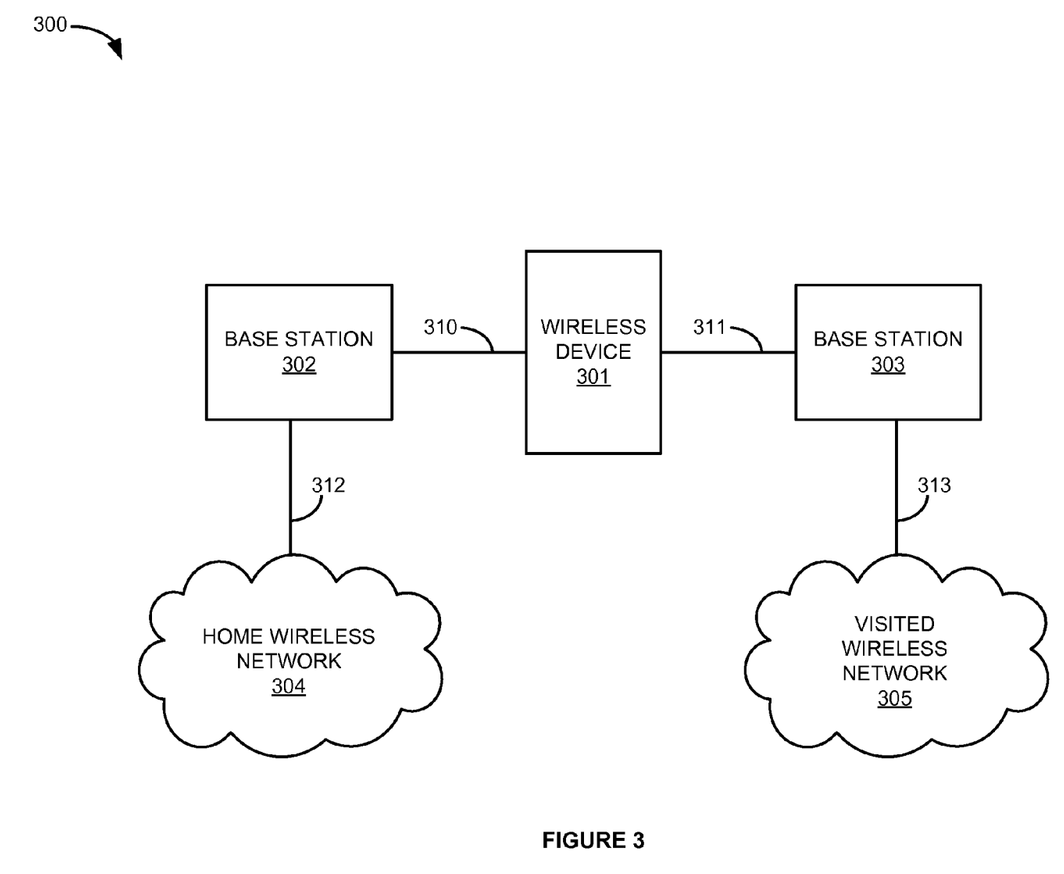
FIG. 3 illustrates a wireless communication system.

FIG. 3 illustrates wireless communication system 300. Wireless communication system 301 includes wireless communication device 301, base station 302, base stations 303, home wireless network (HWN) 304, and visited wireless network (VWN) 305. Wireless communication device 301 and base station 302 communicate over wireless link 310. Wireless communication device 301 and base station 303 communicate over wireless link 311. Base station 302 and HWN 304 communicate over link 312. Base station 303 and VWN 305 communicate over link 313.

Wireless links 310-311 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 312-313 uses metal, glass, air, space, or some other material as the transport media. Communication links 312-313 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 312-313 could be direct links or may include intermediate networks, systems, or devices.

Figure 4:
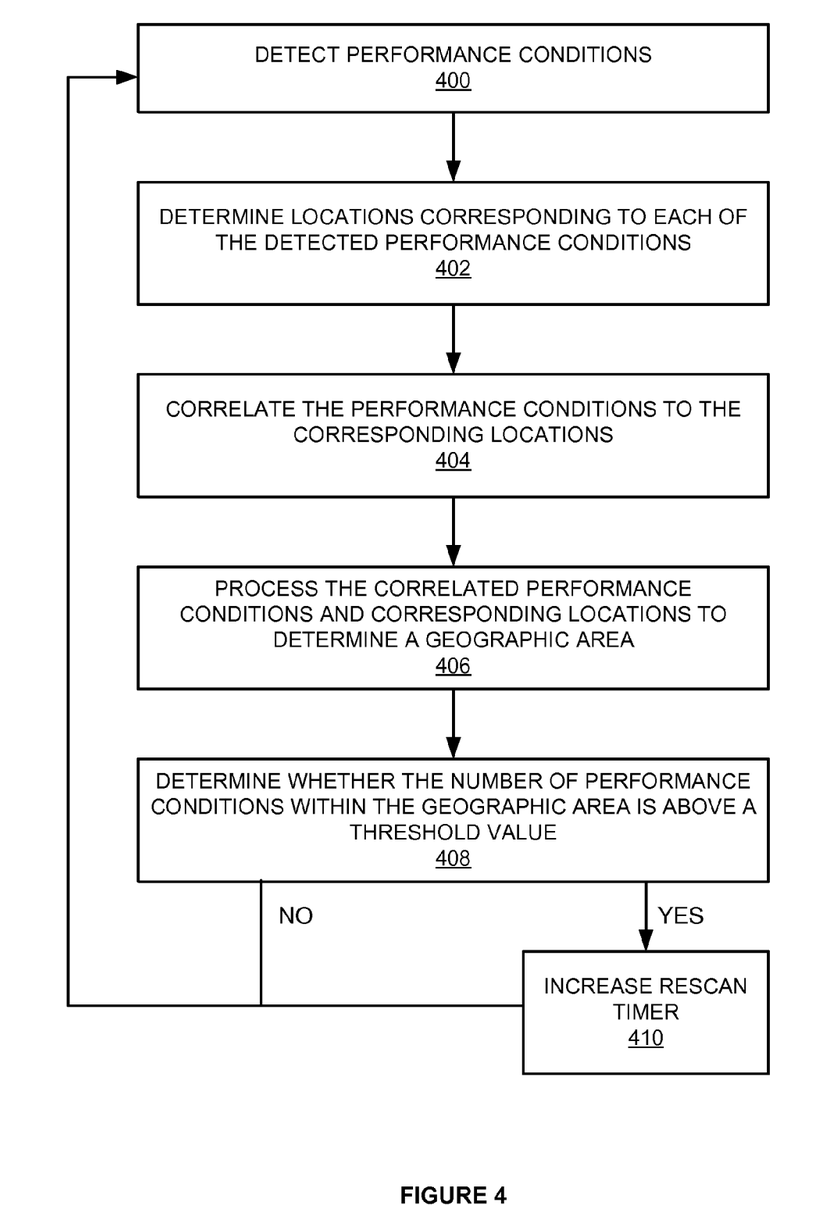
FIG. 4 illustrates the operation of a wireless communication system.

FIG. 4 illustrates the operation of wireless communication system 300 in an example embodiment. Specifically, the steps in FIG. 4 may be performed by wireless communication device 301. In step 400, wireless communication device 301 detects performance conditions occurring after wireless device 301 transitions between communicating with HWN 302 and VWN 303. The performance conditions may include losing wireless connectivity with base station 302 on HWN 304 and reestablishing wireless connectivity with base station 303 on VWN 305, determining that connectivity of wireless device 301 with base station 302 has a signal to noise ratio that falls below a threshold signal to noise value, determining that wireless communications between wireless device 301 and base station 302 have a frame error rate greater than a threshold frame error value, or any other any other issue relating to poor wireless connectivity performance. The performance conditions may be caused by distance from wireless communication device 301 to base stations 302 and 303, geographic elements, buildings and other man made objects, atmospheric conditions, or anything else that may affect wireless connectivity.

In step 402, wireless communication device 301 determines locations corresponding to each of the performance conditions detected in step 400. In some embodiments, wireless communication device 301 determines the location corresponding to each performance condition at the time that wireless communication device 301 detects each of the performance conditions. Wireless communication device 301 may determine the location of wireless communication device 301 by obtaining GPS coordinates, referencing the base station identifiers of base stations 302 and 303, querying HWN 304 or VWN 305, or any other method for ascertaining locations of wireless device 301.

Next, step 404 provides that wireless communication device 301 correlates the performance conditions to the corresponding locations of wireless communication device 301 when the performance conditions occurred. The correlation allows wireless communication device 301, in step 406, to process the correlated performance conditions and corresponding locations to determine a geographic area having performance issues when transitioning between communicating with base station 302 and base station 303. The processing by wireless communication device 301 may determine a pattern of performance conditions occurring in a certain area. For example, if a majority of performance conditions occur at coordinates within a 200 yard radius of a location, then the geographic area may be equal to the area covered by that 200 yard radius. Likewise, if the radius is only 150 yards, then the geographic area may be equal to the area covered by that 150 yard radius. The geographic area may extend to locations covered by other base stations on HWN 304 beyond and in addition to locations covered by base station 302.

While radius from the preceding examples implies that the geographic area is circular, the geographic area need not take any particular shape but may take a variety of shapes corresponding to the location pattern of the detected performance conditions. Additionally, if the location is more general than geographic coordinates, the coverage area of a base station for example, then the geographic area may be the coverage area of the base station where performance issues occurred.

Furthermore, step 408 provides that wireless communication device 301 determines whether the number of performance conditions within the geographic area is above a threshold value. If the number is below the threshold, then wireless communication device 301 returns to step 400 to continue to monitor and detect performance conditions. If the number is above the threshold value and wireless communication device 301 communicates with VWN 305, then wireless communication device 301 increases the rescan timer that wireless communication device 301 uses to determine when to look for HWN 304. For example, the rescan timer may be increased from one minute up to five or ten minutes.

After increasing the rescan timer, wireless communication device 301 returns to step 400 to continue motoring and detecting performance conditions. Therefore, there may be a number of performance condition occurrences that is considered acceptable by wireless communication device 301 to render an increase in the rescan timer unnecessary. For example, five performance condition occurrences may be acceptable while six may be above the threshold of five occurrences.

In some embodiments, the threshold number of performance condition occurrences may need to occur within a period of time. Thus, performance conditions occurring too far in the past are not considered in the threshold calculation. Additionally, those performance conditions occurring too remotely in time may not be considered in the correlation or determination of the geographic area in steps 404 and 406.

In some embodiments, step 410 would further provide that wireless communication device 301 prefer VWN 305. Thus, when preferring VWN 305 wireless communication device 301 does not transfer to communicating with HWN 304 even if HWN 304 is viable for wireless communications as long as VWN 305 is itself viable for wireless communications.

Figure 5:
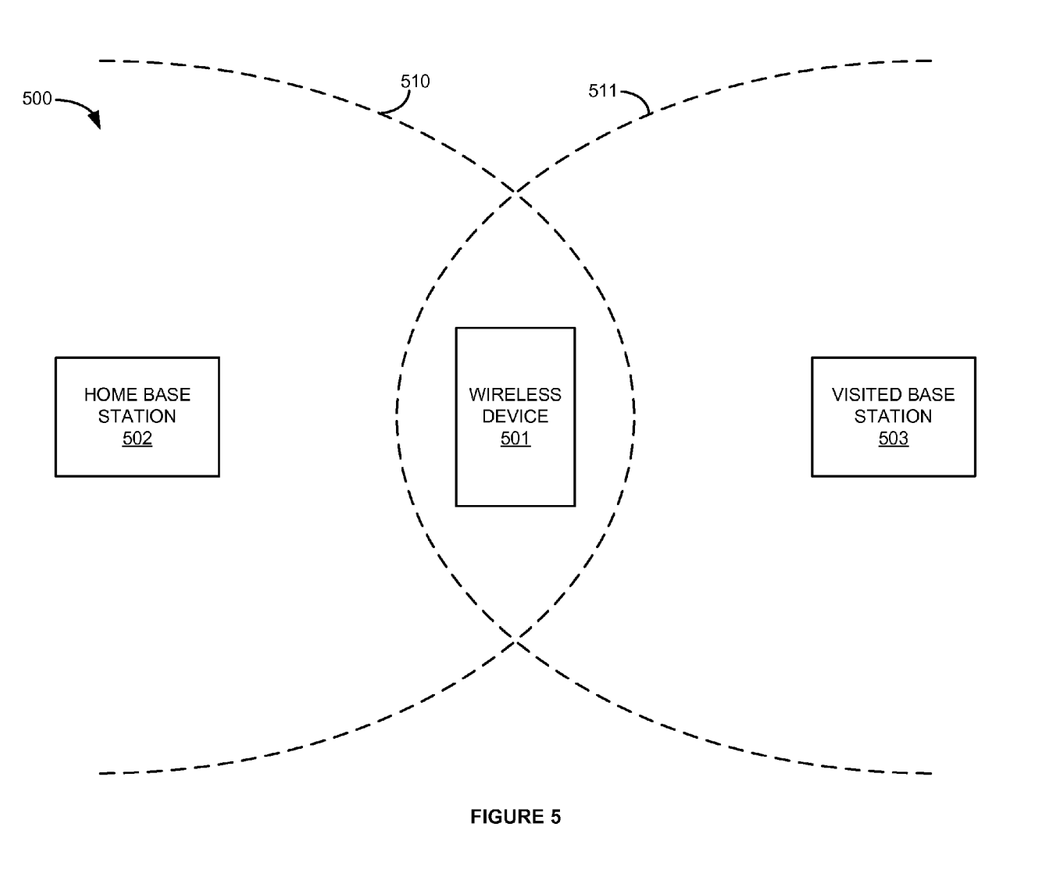
FIG. 5 illustrates a wireless communication system.

FIG. 5 illustrates wireless communication system 500. Wireless communication system includes wireless device 501, home base station 502, and visited base station 503. Home base station 502 is connected to a home wireless network, which is not shown for clarity. Visited base station 503 is connected to a visited wireless network, which is not shown for clarity. Home base station 302 provides wireless coverage area 510. Visited base station 503 provides wireless coverage area 511. FIG. 5 is not drawn to any particular scale.

In this example, wireless device 501 is located at a point where wireless coverage areas 510 and 511 overlap. Therefore, in this area wireless device 501 may transfer between communicating with home base station 502 and visited base station 503. The overlapping coverage area may be at a distance from home base station 502 and visited base station 503 that the wireless signal from each base station may become less reliable causing wireless device 501 to constantly transfer between communicating with home base station 502 and visited base station 503.

Figure 6:
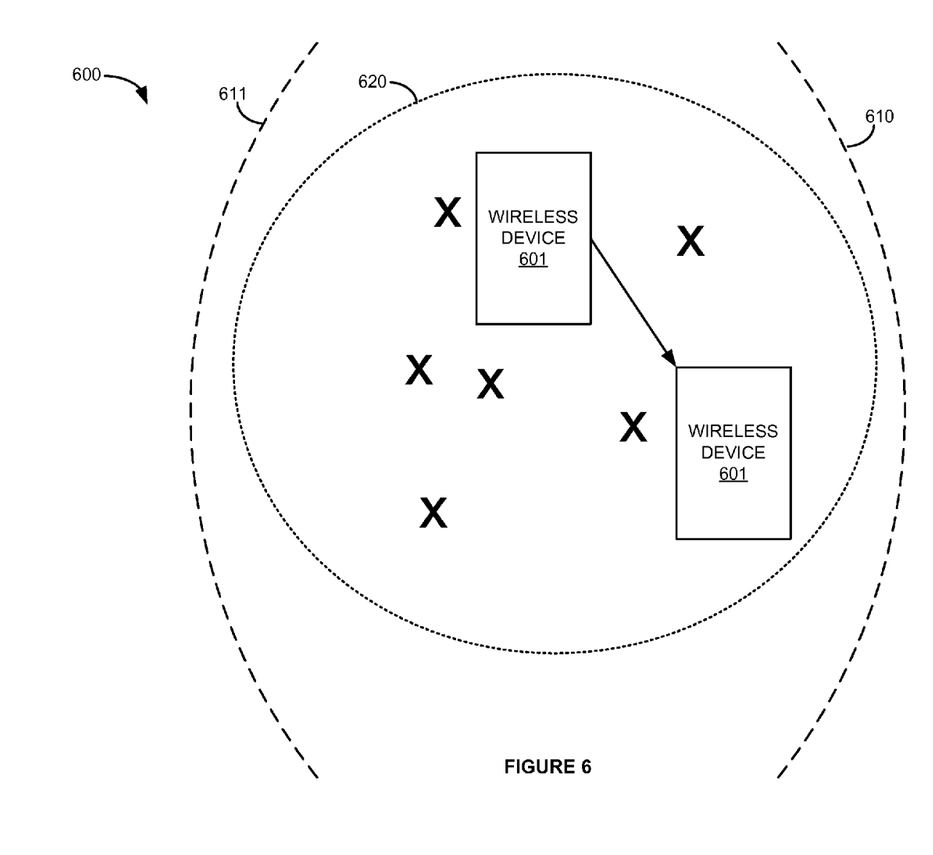
FIG. 6 illustrates a geographic area.

FIG. 6 is a magnification of the wireless coverage overlap area from FIG. 5. Thus, home base station 502 may provide wireless coverage area 610 and visited base station 503 may provide wireless coverage area 611. FIG. 6 is not drawn to any particular scale.

In operation, wireless communication device 601 detects performance conditions and determines the corresponding locations of each performance condition occurrence. The Xs shown in FIG. 6 are locations where wireless communication device 601 detected a performance condition. Wireless communication device 601 correlates the performance conditions with the corresponding locations to determine geographic area 620. Geographic area 620 is a geographic area that wireless device 601 has determined, based on patterns in the correlation, to be an area where wireless communication device 601 is most likely to experience negative performance issues.

After determining geographic area 620, wireless communication device 601 increases the home wireless network rescan timer of wireless communication device 601. Thus, whenever wireless device 601 communicates with a visited wireless network while in geographic area 620 the length of time in between searches for the home wireless network by wireless communication device 601 due to the increase in the rescan timer. Wireless communication device 601 may also prefer communicating with the visited wireless network while in geographic area 620.

Wireless communication device 601 may move from one location to another within geographic area 620, as illustrated by the arrow in FIG. 6. In that event, the rescan timer will stay at its increased value because wireless communication device 601 is still located within geographic area 620 that wireless communication device 601 determined to experience performance issues.

Figure 7:
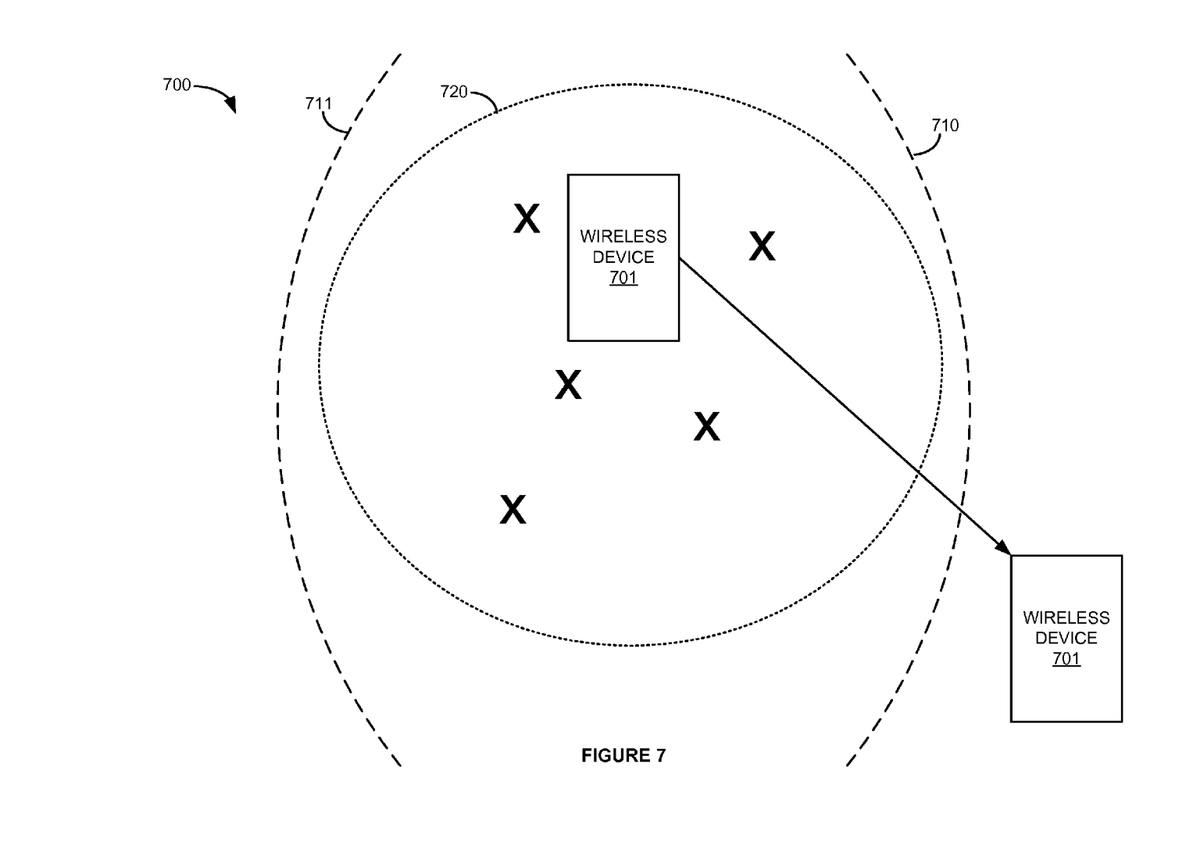
FIG. 7 illustrates a geographic area.

FIG. 7, like FIG. 6, is a magnification of the wireless coverage overlap area from FIG. 5. Thus, home base station 502 may provide wireless coverage area 710 and visited base station 503 may provide wireless coverage area 711. FIG. 7 is not drawn to any particular scale.

Wireless communication device 701 determined that geographic area 720 was suffering performance issues due to the performance conditions indicated by the Xs. In this example, wireless communication device 701 moves out of geographic area 720 as indicated by the arrow in FIG. 7. When wireless communication device 701 moves out of geographic area 720 the rescan timer is reset to a default value. Additionally, wireless communication device 301 may return to preferring the home wireless network over the visited wireless network.

Figure 8:
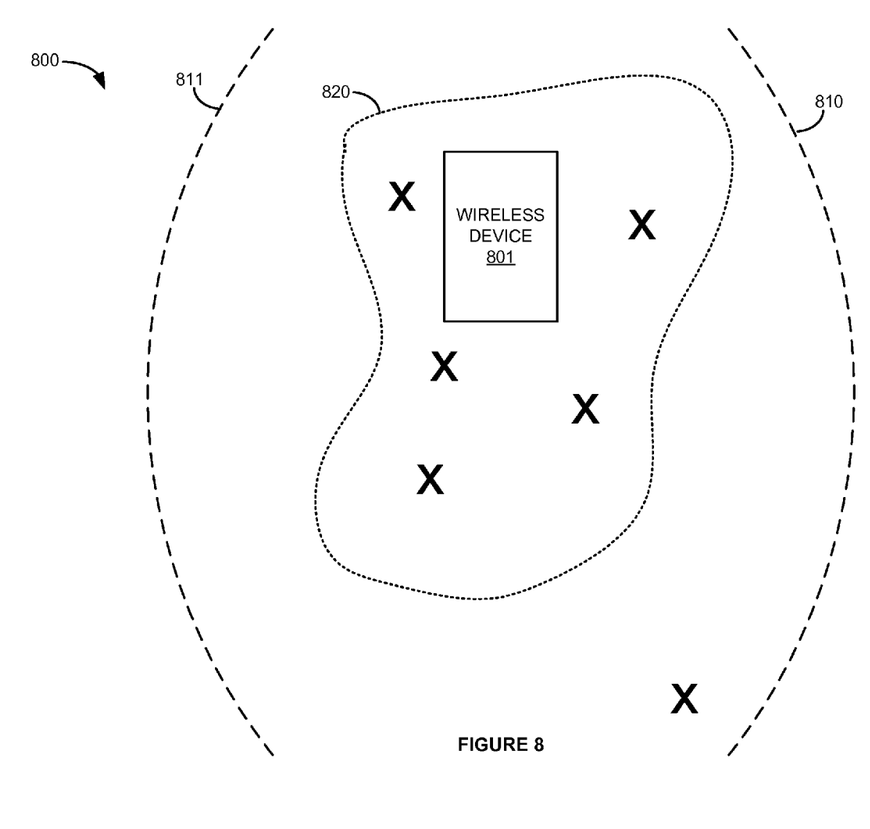
FIG. 8 illustrates a geographic area.

FIG. 8 is another magnification of the wireless coverage overlap area from FIG. 5. Thus, home base station 502 may provide wireless coverage area 810 and visited base station 503 may provide wireless coverage area 811. FIG. 8 is not drawn to any particular scale.

In FIG. 8, geographic area 820 is shown not conforming to any geometric shape. Wireless communication device 301 may use an algorithm to determine a best-fit geographic area around the performance condition locations to make up geographic area 820. The best-fit determination may leave performance conditions out of geographic area 820, such as the one X shown outside of geographic area 820, based on a determination that the excluded performance conditions are outliers or anomalies that should not be regarded in the determination of geographic area 820.

Figure 9:
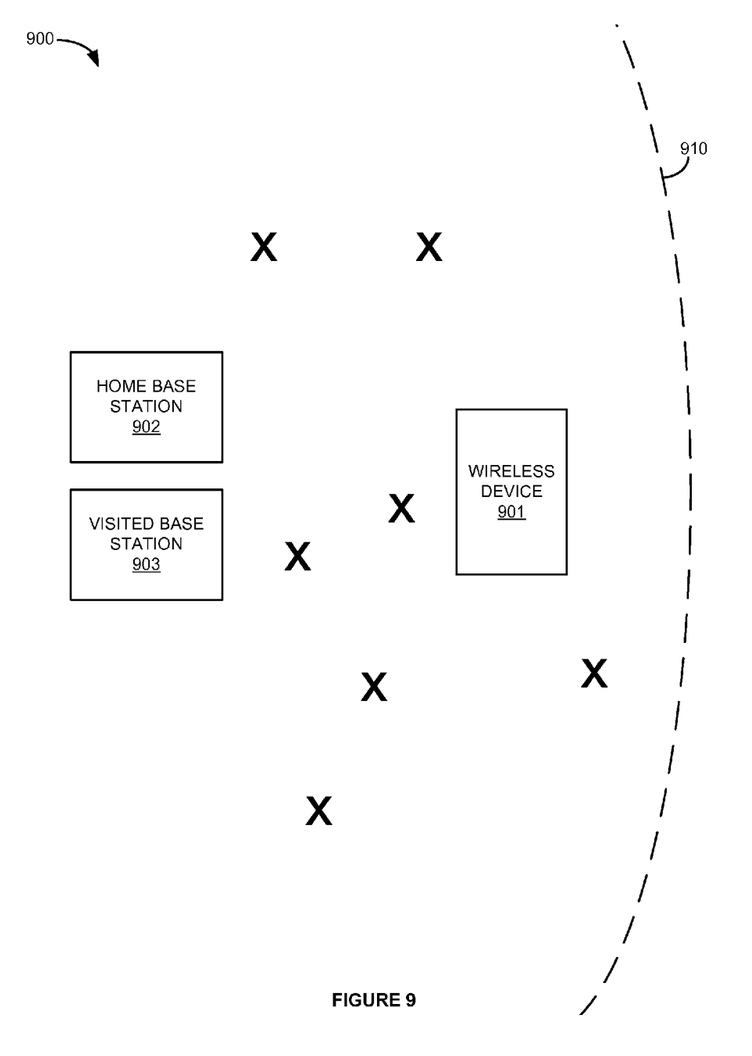
FIG. 9 illustrates a wireless communication system.

FIG. 9 illustrates wireless communication system 900. Wireless communication system includes wireless device 901, home base station 902, and visited base station 903. Home base station 902 is connected to a home wireless network, which is not shown for clarity. Visited base station 903 is connected to a visited wireless network, which is not shown for clarity. Home base station 902 and base station 903 provide similar wireless coverage area 910. FIG. 9 is not drawn to any particular scale.

In this example, wireless device 901 is in an area where home base station 902 and visited base station 903 have a similar wireless coverage area 910. The Xs represent locations where wireless communication device 901 detected the occurrence of a performance condition. In this example, the geographic location determined to have performance issues is the coverage area 910 or home base station 902. Wireless communication device 901 correlates the performance conditions with the corresponding locations to determine that coverage area 910 is where wireless communication device 901 is having performance issues when communicating with home base station 902.

Wireless communication device 901 increases the rescan timer of wireless communication device 901 while wireless communication device 901 is within coverage area 910 of home base station 902. Thus, wireless communication device 901 roams using visited base station 903 while in coverage area 910 and scans to determine whether base station 902 is viable for wireless communications when the rescan timer expires. If not, then wireless communication device 901 continues to roam. Likewise, the rescan timer is reset to a default values when wireless communication device 901 moves from coverage area 910.

In the example from FIG. 9, wireless communication device 901 may not know the actual location coverage area 920 in order to know the geographic area that is experiencing performance issues. Instead, wireless communication device 901 may simply know the base station identifier for home base station 902 and associate base station 902 with the geographic area experiencing performance issues. Thus, upon expiration of the rescan timer, if wireless communication device 901 scans for a home base station and finds home base station 902 available for communications, then wireless communication device 901 will not transfer communications to home base station 902 because wireless communication device 901 recognizes base station 902 as being locating in a geographic area experiencing performance issues.

Figure 10:
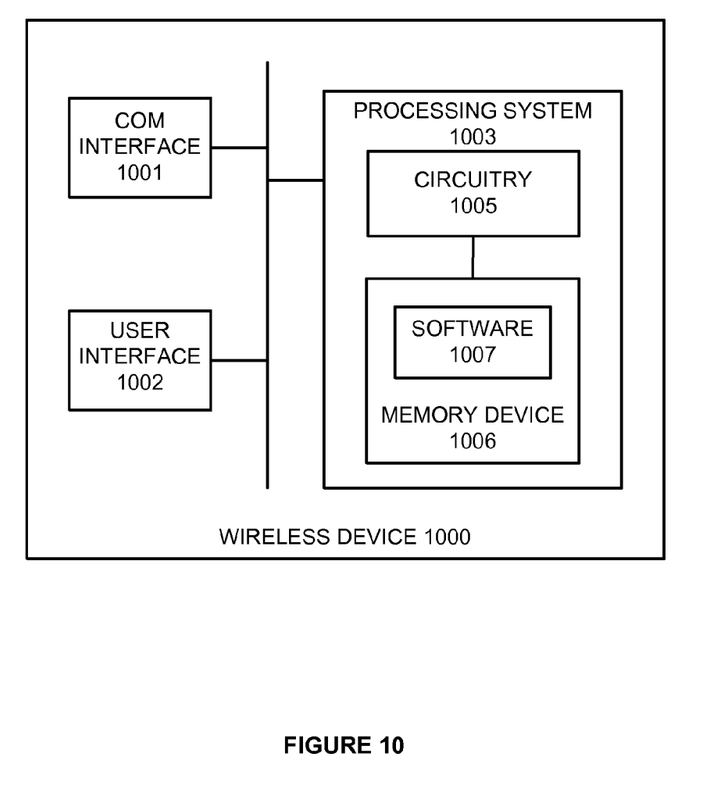
FIG. 10 illustrates a wireless communication device.

FIG. 10 illustrates wireless communication device 1000. Wireless communication device 1000 is an example of wireless communication device 101, although device 101 could use alternative configurations. Wireless communication device 1000 comprises wireless communication interface 1001, user interface 1002, and processing system 1003. Processing system 1003 is linked to wireless communication interface 1001 and user interface 1002. Processing system 1003 includes processing circuitry 1005 and memory device 1006 that stores operating software 1007. Wireless communication device 1001 may include other well-known components such as a battery and enclosure that are not shown for clarity. Wireless communication device 1001 may be a telephone, computer, e-book, mobile Internet appliance, media player, game console, wireless network interface card, or some other wireless communication apparatus—including combinations thereof.

Wireless communication interface 1001 comprises RF communication circuitry and an antenna. The RF communication circuitry typically includes an amplifier, filter, RF modulator, and signal processing circuitry. Wireless communication interface 1001 may also include a memory device, software, processing circuitry, or some other communication device. Wireless communication interface 1001 may use various protocols, such as CDMA, EVDO, WIMAX, GSM, LTE, WIFI, HSPA, or some other wireless communication format.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input/output apparatus—including combinations thereof. User interface 1002 may be omitted in some examples.

Processing circuitry 1005 comprises microprocessor and other circuitry that retrieves and executes operating software 1007 from memory device 1006. Memory device 1006 comprises a disk drive, flash drive, data storage circuitry, or some other memory apparatus. Processing circuitry 1005 is typically mounted on a circuit board that may also hold memory device 1006 and portions of communication interface 1001 and user interface 1002. Operating software 1007 comprises computer programs, firmware, or some other form of machine-readable processing instructions. Operating software 1007 may include an operating system, utilities, drivers, network interfaces, applications, or some other type of software. When executed by processing circuitry 1005, operating software 1007 directs processing system 1003 to operate wireless communication device 1000 as described herein.

In particular, communication interface 1001 communicates with a home wireless network and a visited wireless network. Operating software 1007 directs processing system 1003 to determine locations of wireless communication device 1000 and detect performance conditions when wireless communication device 1000 transitions between communicating with a home wireless network and a visited wireless network. Additionally, processing system 1003 correlates the performance conditions to the corresponding locations of wireless communication device 1000 and processes the correlated performance conditions and corresponding locations to determine a geographic area having performance issues when transitioning between communicating with the home wireless network and the visited wireless network. If wireless communication device 1000 communicates with the visited wireless network when in the geographic area, then processing system 1003 increases the home wireless network rescan timer.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
   determining locations of the wireless communication device;
   detecting performance conditions when the wireless communication device transitions between communicating with a home wireless network and a visited wireless network;
   correlating the performance conditions to the corresponding locations of the wireless communication device;
   processing the correlated performance conditions and corresponding locations to determine a geographic area having performance issues when transitioning between communicating with the home wireless network and the visited wireless network; and
   if the wireless communication device communicates with the visited wireless network when in the geographic area, increasing the home wireless network rescan timer.

2. The method of claim 1 further comprising preferring the visited wireless network for communications by the wireless communication device if the wireless communication device communicates with the visited wireless network when in the geographic area.

3. The method of claim 1 further comprising returning the rescan timer to a default time value if the wireless communication device moves out of the geographic area.

4. The method of claim 1 wherein the performance issues in the geographic area occur within a finite period of time.

5. The method of claim 1 wherein a performance condition comprises losing wireless connectivity with the home wireless network and reestablishing wireless connectivity with the visitor wireless network.

6. The method of claim 1 wherein a performance condition comprises the wireless connectivity of the wireless communication device with the home wireless network having a signal to noise ratio that falls below a threshold signal to noise value.

7. The method of claim 1 wherein a performance condition comprises the wireless communications between the wireless communication device and the home wireless network having a frame error rate greater than a threshold frame error value.

8. The method of claim 1 wherein the locations comprise base station identifiers.

9. The method of claim 1 wherein the geographic area comprises a boundary zone between a visited base station in the visited wireless network and a home base station in the home wireless network.

10. The method of claim 1 wherein the geographic area comprises a pair of base station identifiers for a visited base station in the visited wireless network and a home base station in the home wireless network.

11. A wireless communication device comprising:
    a wireless communication interface configured to communicate with a home wireless network and a visited wireless network;
    a processing system configured to determine locations of the wireless communication device, detect performance conditions when the wireless communication device transitions between communicating with a home wireless network and a visited wireless network, correlate the performance conditions to the corresponding locations of the wireless communication device, processing the correlated performance conditions and corresponding locations to determine a geographic area having performance issues when transitioning between communicating with the home wireless network and the visited wireless network, and, if the wireless communication device communicates with the visited wireless network when in the geographic area, increase the home wireless network rescan timer.

12. The wireless communication device of claim 11 wherein the processing system is further configured to prefer the visited network for communications by the wireless communication device if the wireless communication device communicates with the visited wireless network when in the geographic area.

13. The wireless communication device of claim 11 wherein the processing system is further configured to return the rescan timer to a default time value if the wireless communication device moves out of the geographic area.

14. The wireless communication device of claim 11 wherein the performance issues in the geographic area occur within a finite period of time.

15. The wireless communication device of claim 11 wherein a performance condition comprises losing wireless connectivity with the home wireless network and reestablishing wireless connectivity with the visitor wireless network.

16. The wireless communication device of claim 11 wherein a performance condition comprises the wireless connectivity of the wireless communication interface with the home wireless network having a signal to noise ratio that falls below a threshold signal to noise value.

17. The wireless communication device of claim 11 wherein a performance condition comprises the wireless communications between the wireless communication interface and the home wireless network having a frame error rate greater than a threshold frame error value.

18. The wireless communication device of claim 11 wherein the locations comprise base station identifiers.

19. The wireless communication device of claim 11 wherein the geographic area comprises a boundary zone between a visited base station in the visited wireless network and a home base station in the home wireless network.

20. The wireless communication device of claim 11 wherein the geographic area comprises a pair of base station identifiers for a visited base station in the visited wireless network and a home base station in the home wireless network.

* * * * *